United States Patent [19]

Weh et al.

[11] Patent Number: 4,663,551

[45] Date of Patent: May 5, 1987

[54] ELECTRICAL MACHINE

[75] Inventors: Herbert Weh, Wöhlerstr. 20, 3300 Braunschweig; Hardo May, Braunschweig, both of Fed. Rep. of Germany

[73] Assignee: Herbert Weh, Braunschweig, Fed. Rep. of Germany

[21] Appl. No.: 605,699

[22] Filed: May 1, 1984

[30] Foreign Application Priority Data

May 2, 1983 [DE] Fed. Rep. of Germany ....... 3315921
Jul. 14, 1983 [DE] Fed. Rep. of Germany ....... 3325373
Jan. 14, 1984 [DE] Fed. Rep. of Germany ....... 3401163

[51] Int. Cl.$^4$ ............................................. H02K 21/00
[52] U.S. Cl. .................................... 310/152; 310/156; 310/14; 310/12
[58] Field of Search ...................... 310/12, 13, 14, 182, 310/154, 156, 216, 218, 157, 261, 162, 163, 164

[56] References Cited

U.S. PATENT DOCUMENTS

| | | | |
|---|---|---|---|
| 3,403,272 | 9/1968 | Dold | 310/12 |
| 3,567,974 | 3/1971 | Spingler | 310/156 X |
| 3,999,107 | 12/1976 | Reuting | 310/12 X |
| 4,047,062 | 9/1977 | Ludin et al. | 310/157 X |
| 4,210,831 | 7/1980 | Hurst | 310/216 X |
| 4,354,126 | 10/1982 | Yates | 310/156 |
| 4,408,145 | 10/1983 | Artemonko et al. | 310/12 X |

FOREIGN PATENT DOCUMENTS 447350 11/1967 Switzerland .

Primary Examiner—Donovan F. Duggan
Attorney, Agent, or Firm—Gottlieb, Rackman & Reisman

[57] ABSTRACT

An electrical machine, which may be designed as a rotating machine or as a linear drive, includes a stationary part having an odd number multiphase winding (preferably five or seven phases), and a movable part separated from the stationary part by an effective gap. Each pole of the movable part includes two pole portions which diverge from each other in the direction away from the effective gap and between the end regions of which at the effective gap a magnetically non-conductive separating gap is provided which is greater than the effective gap. In such a machine, which is characterized by a permanent excitation in the movable part, there is provided between the proximate pole portions of each of adjacent poles a respective permanent magnet, the direction of flux of each permanent magnet being directed oppositely to the direction of flux of each adjacent permanent magnet. Each rotor pole portion may be formed of a plurality of pole laminations the planes of which are oriented either transverse to or in the direction of motion of the movable part, the laminations being separated by non-magnetic spaces, and at the face of each rotor pole adjacent to the effective gap a magnetically effective enlargement of that gap is provided which extends over at least one slot pitch of the stationary part.

11 Claims, 13 Drawing Figures

ELECTRICAL MACHINE

FIELD OF THE INVENTION

The invention relates to electrical machines comprising a stationary part having a multiphase winding, and a movable part separated from the stationary part by an effective gap, with poles being formed at said movable part and being magnetically connected to each other.

The electrical machine may be a rotating machine with stator and rotor or a linear drive with a stator and a translator or exciting element respectively.

Electrical machines with permanent magnet excitation offer advantages in comparison with electrically excited machines. Particularly in the case of power supply: via a current inverter, machines of very simple construction can be constructed, which can be designed with a high number of poles and low iron masses. Their efficiency is higher than that of electrically excited machines. High energy density permanent magnets (high flux density-field strength product) prove thereby to be superior to lower density ones.

DESCRIPTION OF THE PRIOR ART

It has been known that permanent magnets are applicable not only to the arrangement with direct assignment to the effective gap (flat layout), but also in the flux concentration scheme. The direct assignment to the effective gap means that the flux density of the magnet is approximately equal to that of the effective gap itself. This applies at least while the effective gap is small in comparison with the magnet height. The flux concentration scheme permits higher flux densities in the effective gap than in the magnet. This is achieved by a large area layout of the magnets, in which the cross-sectional area of the magnet is larger than the pole area in the effective gap. The flux density in the magnet is correspondingly less than that in the pole region. The thereby necessary flux diversion requires special soft iron poles, in contrast to the direct assignment of the permanent magnet to the effective gap.

The flux concentration arrangement is particularly suitable for generating high flux densities in the effective gap, thus giving rise to the advantage of improved magnet material utilization. For magnets with a largely linear demagnetiztion characteristic (in the second quadrant), a large magnet cross-section leads to magnet utilization close to the energy maximum. This can be achieved at a flux density which corresponds to one half of the remanence induction. Higher flux densities can be achieved for the same magnet material outlay than in the arrangement of direct assignment of the permanent magnet to the effective gap. In the latter an increase in magnet height only brings a slight enhancement in flux density. As the energy product diminishes again with increasing height, the magnetic material utilization falls off above an optimal magnet height.

It is desirable to achieve higher flux densities than those attainable at direct assignment of the magnets to the effective gap. The well-known disadvantages of the flux concentration arrangement consisting of high armature reaction and large leakage flux, should not come into play. It is an object of the invention to provide a configuration which utilizes the magnet material as best as possible whilst also having the advantage of a large magnetic resistance for the indicated field lines. Another object is the transition to a machine design concept completely lacking in permanent magnets and a rotor with laminated salient poles (reluctance motor) as a logical consequence of the intended developments.

According to the invention each of the poles of the movable part of the machine comprises two adjacent pole portions, between which a magnetically non-conductive separating gap is provided which is greater than the effective gap, and the two pole portions diverge from each other in the direction away from the effective gap.

Machines with permanent magnet excitation of the moving part carry slabs of permanent magnet material between the pole portions of adjacent poles. The direction of the magnetization of said permanent magnetic material is parallel to the effective gap. The direction of the flux of two adjacent permanent magnets is opposite to each other, producing an alternating pole pattern in circumferential direction. For large armature ampere turns the pole parts are advantageous subdivided into laminations directed orthogonally to the direction of motion and separated by non-magnetic spaces between said laminations. Said spaces can be filled by a magnetically poorly conducting material of sufficiently large mechanical strength. It is advantageous to assemble the pole laminations from iron sheets oriented orthogonal to the direction of motion.

With an implementation of the machine as a reluctance machine the laminations of the pole portions of two adjacent poles are magnetically connected with each other by bridges of magnetically conducting material, connecting the inner ends of the converging laminations and extending in the direction of motion. In the region between each two poles the effective gap is enlarged over at least one slot pitch of the stationary part. For compensation of the field of the armature winding, thin layers of permanent magnet material can be arranged between the laminations carrying a magnetization directed normally to the plane of the laminations.

For a preferred embodiment the stationary part is equipped with a multiphase winding with a number of phases larger than three per pole of the moving part. It is preferred to choose an odd number of phases in the stationary part related to the pole width of the moving part. Five or seven phases per pole are especially suitable.

At rated power the slots in the pole region carry equal currents. The slot currents in the slots adjacent to the gap between the poles determine the non-load field of the reluctance machine version while they are zero in the exclusively permanent magnet excited machine.

DESCRIPTION OF THE FIGURES

FIG. 1 shows the permanent magnet 1 directly assigned to the effective gap in flat layout, a stator 2 with current-carrying slots 3, a stator yoke 4 and a rotor or translator yoke 5. The field generated by the magnets corresponds to the field line b.

Figure 1:
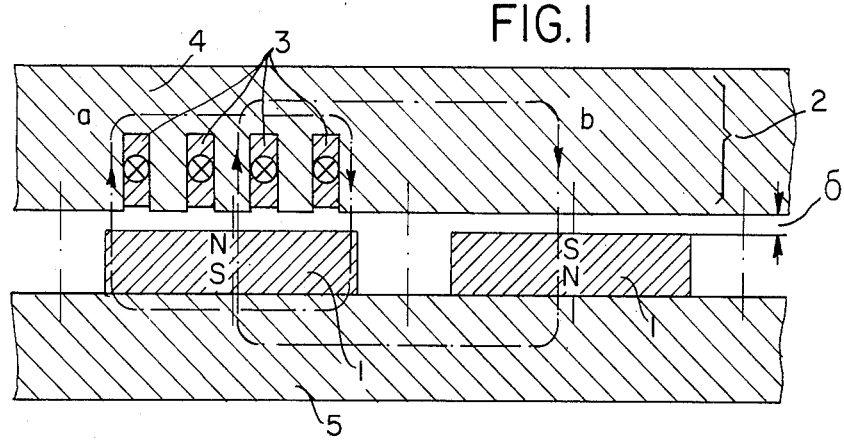
FIG. 1 shows schematically an electric machine with the permanent magnet excited moving part in flat magnet arrangement.

In the known flux configuration scheme according to FIG. 2 the stator 12 is again constructed with the current-carrying slots 13 in a stator yoke 14. The rotor 16 carries poles 15, between which permanent magnets 11 are located with alternating direction of flux. The magnet flux is collected in the poles and diverted to the effective gap. For this purpose wedge-shaped sections 17 are provided at the base of the poles. By the appropriate choice of the parameter of magnet height and magnet cross-section the magnet utilization can be kept at the optimum. For a given magnetic material outlay of higher flux densities can always be attained along the field lines b by the effective gap $\delta$.

In practical applications, however, it proves to be disadvantageous that relatively large leakage flux components occur on the field lines c at the ends of the poles directed away from the effective gap. In consequence, only a part of the magnet cross-section is available to magnetize the effective gap. There are also corresponding leakage fluxes at the lateral end faces of the magnet. The leakage flux magnitude increases for decreasing magnet heigth (in the direction of magnetization). The described dimensioning advantages are to some extent reduced owing to the increased effect of leakage flux components with decreasing magnet height.

Figure 2:
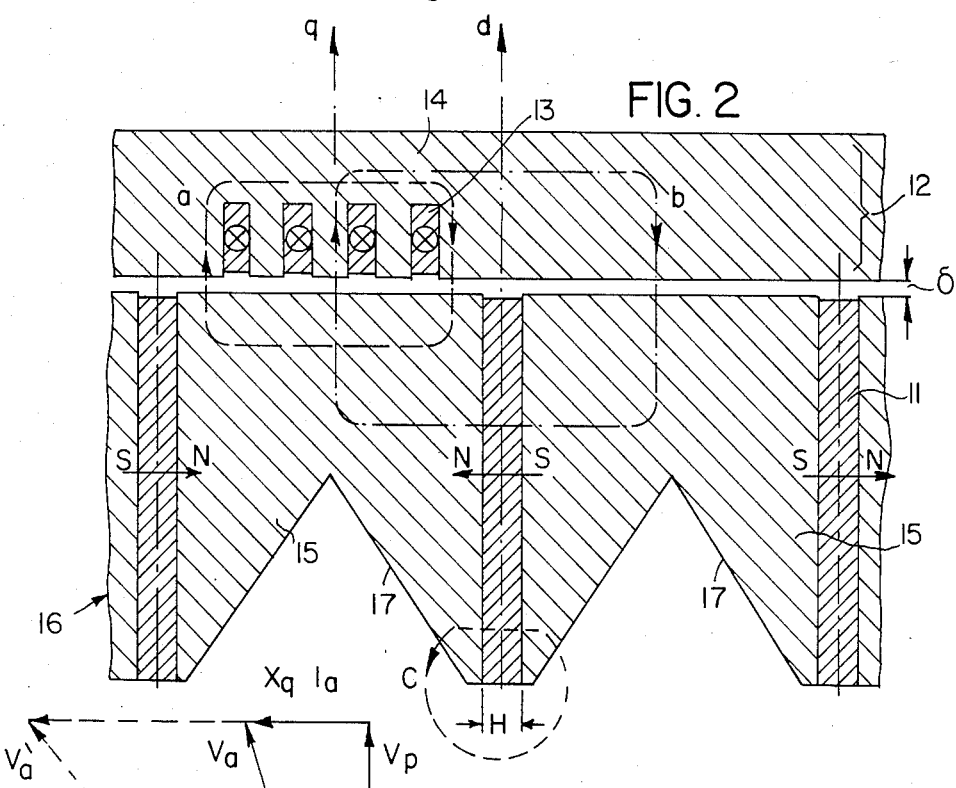
FIG. 2 shows schematically an electrical machine with the permanent magnet excited moving part in flux concentration arrangement.

A further considerable disadvantage of arrangements of the type shown in FIG. 2 is that the stator winding current causes a strong field distortion. In contrast, it is held to be of advantage in the flat arrangement according to FIG. 1 that the flux densities on the field lines a only reach small values by the magnet. This is a consequence of the fact that the magnet material has an effect on external field similar to that of air. It can also be ascertained that the armature reaction causes a lesser field distortion for greater magnet height.

High magnets are favorable for machines with large stator currents, although they represent an uneconomic solution to the problem with regard to the generation of a high field density. The practical application of the magnet circuit layout as given in FIG. 2 is, however, heavily impeded by the strong armature reaction. This also acts to reduce the attainable force density.

Figure 3:
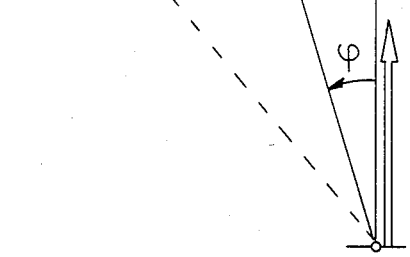
FIG. 3 shows a phasor diagram.

A high field distortion also has further disadvantages for current inverter fed machines, which are explained by means of the diagram according to FIG. 3. The field component of the stator currents on the q axis causes a large transverse voltage component $X_q \cdot I_a$ (dashed line component in FIG. 3). The corresponding voltage component is entered in the diagram at right angles to the excitation EMF phasor $V_p$. The stator voltage magnitude $V'_a$ is correspondingly large in comparison with the voltage $V_p$. In the dimensioning of the current inverter, the voltage enlargement is equivalent to the necessity to select larger construction elements. A magnet design as in FIG. 1, however, enables a narrow voltage diagram with a smaller stator field voltage component and a correspondingly reduced stator voltage $V_a$ (solid line section of diagram). An improved magnet design is therefore desired, which combines the advantages of both concepts.

The magnet arrangement shown in FIG. 1 offers no satisfactory means of effectively applying the magnet material, if high air gap flux densities are to be achieved. A flux density of more than 0.6 T, for example, already leads, even when particularly high performance rare earth cobalt magnets are employed, to an excessive magnet height. The energy density already lies beyond the optimal value.

For the solution searched for in case of a permanently excited machine it is thus necessary to start with the flux concentration arrangement according to FIG. 2. In order to eliminate the disadvantage of high armature reaction on field lines corresponding to a, the field line curves b must not be disturbed by increased magnetic resistances. A high magnetic conductance to the air gap must be sustained for parts of the magnets which are both near to and far removed from the air gap.

Figure 4:
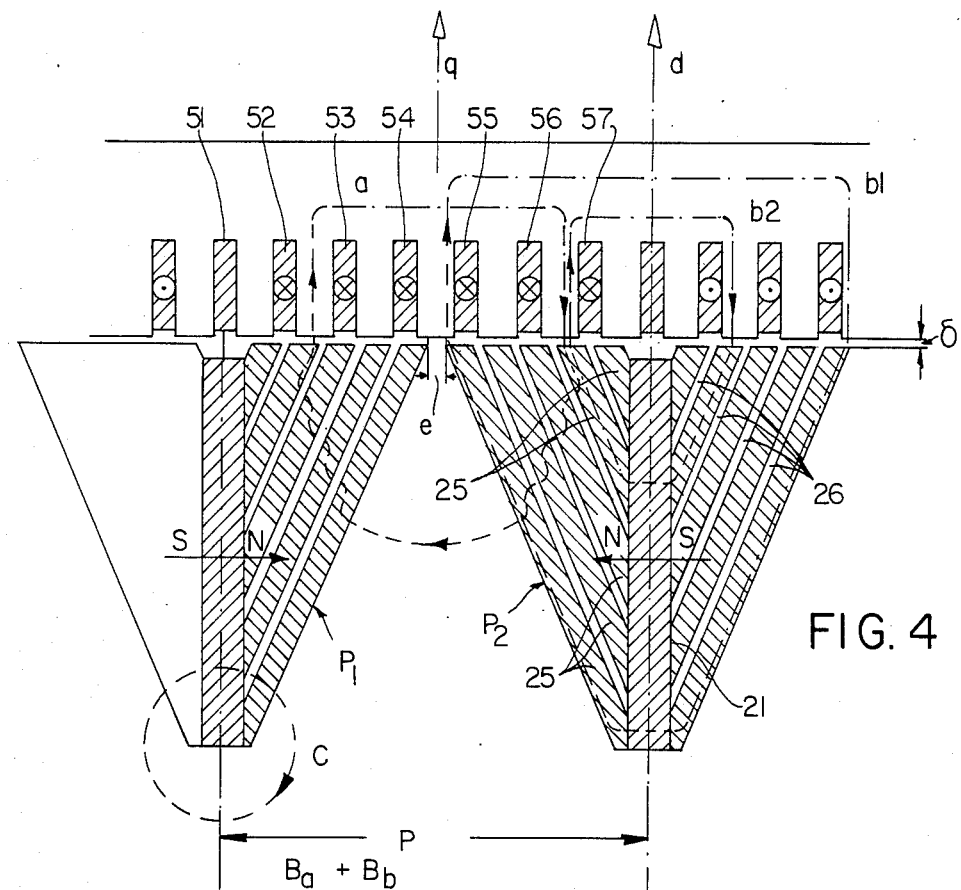
FIG. 4 shows schematically a first embodiment of a machine according to the invention with poles on the moving part excited by permanent magnets.

On the other hand, field lines of the shape a, with paths via the soft iron of the poles as shown in FIG. 2, must be interrupted. An initial step in the enlargement of the magnetic resistance offered to the field lines a is, as shown in FIG. 4, the provision of a gap e in the pole center. This gap must stretch over the complete height of the pole P. Thus the pole P is divided into two pole portions $P_1$ and $P_2$. In order to be effective it should be larger than the effective gap $\delta$, in particular when the pole ampere turns of the stator winding are large. If machines having a large pole pitch are to be constructed with a high current loading, it becomes clear that a subdivision of the poles by solely the gap e is only of limited help. In addition, considerable distortions occur within the pole halves so that a large variation arises between maximum and minimum flux density values. On taking saturation into account, this signifies a reduction in the mean flux density.

Figure 5:
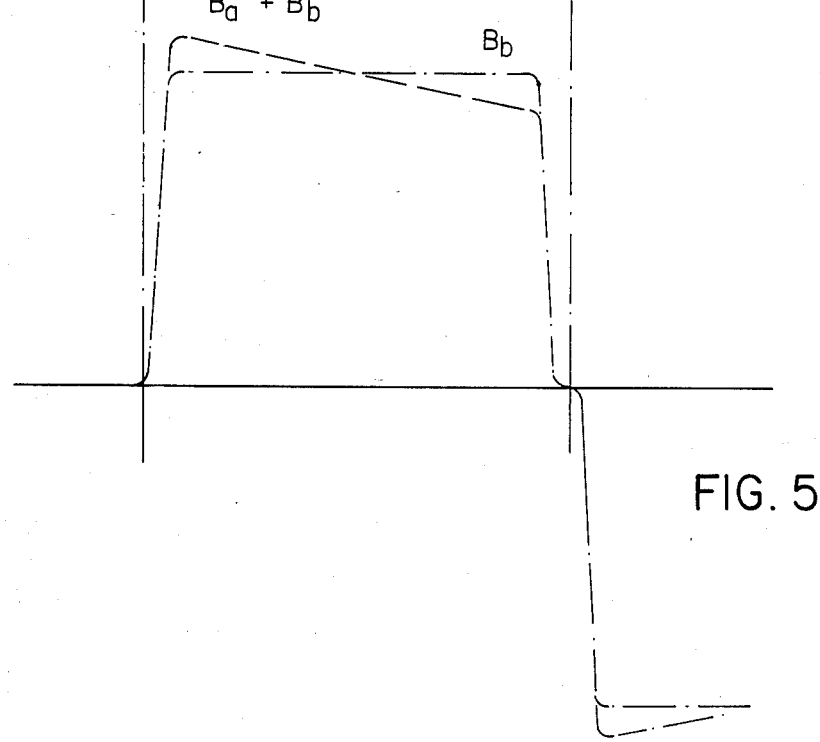
FIG. 5 shows the flux density distribution of the machine according to FIG. 4.

An effective countermeasure to suppress even local field distortions is provided by pole lamination of the pole portions $P_1$ and $P_2$ corresponding to the embodiment according to FIG. 4, in particular even for large pole pitches. This offers at the same time a favourable design with regard to undisturbed field developments in the effective gap $\delta$. The connection between the permanent magnets 21, standing in their direction of flux at right angles to the gap e between the pole portions, and the effective gap $\delta$ is achieved via a lamina-like soft iron pole arrangement 25 with intermediate non-magnetic spaces 26. The intermediate spaces can be filled with solid material (e.g. polycarbonates or non-magnetic metals), which is not shown in the drawing. The proportion of non-magnetic material determines the effective residual magnetic conductance normal to the lamination 25. This conductance is considerably lower than the conductance in a longitudinal direction. The arrangement shown allows each tooth of the anchor or stator constructed corresponding to the embodiments according to FIGS. 1 and 2 between the magnets to be supplied with approximately equal flux density. There is then over the whole pole region, corresponding to the diagram according to FIG. 5, a constant induction $B_b$. Local variations due to the shown open slots are not represented.

In order to avoid saturation effects, it should be assumed that the sum of the lamination thicknesses at least corresponds to the sum of the tooth widths. As can be seen in FIG. 4, field lines of the shape a now experience a heightened resistance in that several non-magnetic spaces or slits 26 and the relatively large gap e in the pole center have to be bridged. Thus the flux component assignable to the field line a for a given number of ampere turns is much smaller than in case of the known embodiment according to FIG. 2. The flux density $B_a$, which is superposed on the no-load field, is small even by comparison with the flat arrangement (FIG. 1). The resulting field in the air gap deviates only slightly from the shape of the no-load field $B_b$, even for large stator currents.

With the laminated embodiment of especially mainly triangle-shaped pole portions diverging from each other in the direction away from the effective gap, a largely effective stator field suppression without affecting the no-load field. The force density (force per unit surface area) attains a larger value than for machines which are constructed approximately as shown in FIG. 2.

As one can ascertain from comparison of FIGS. 2 and 4, the spaces or slits 26 between the laminations 25 also lead to a weakening of the magnetic flux components on field paths of type c (leakage flux components). Thus only a very small proportion of the permanent magnet serves to generate the stray flux; by far the largest part is reserved for the excitation of the useful flux.

A complete avoidance of stray flux corresponding to the field line c is possible with a double-sided symmetrical arrangement of excitation element and stator. This double-sided arrangement can, for example with axial field machines, be realized fairly simply.

It can in principle be stated that the described flux concentration scheme with laminated triangular poles is equally suitable for axial and radial field designs.

As mentioned, the magnetically poorly conducting or non-magnetic spaces between the laminations can be filled with mechanically very stable material so that the lamination block forms a sturdy unit. This thus also allows high peripheral speeds to be accommodated. Securing of the permanent magnets by the use of capping elements would also appear appropriate at high peripheral speeds. The soft iron laminations 25 can be made of magnetically well-conducting steel or even from several layers of dynamo sheet iron. To attain low degradation of the effective gap field $B_b$, it is advisable to employ relatively fine partitioning, whereby the slit width in relation to the air gap plays a role. The best possible utilization of the magnet material also supports the use of small lamination separation in the design. Larger slits cause bending or lengthening of the field lines within the magnet material 21, which is equivalent to an increased magnetic resistance.

The relatively fine lamination also proves to be advantageous with regard to the suppression of eddy current losses, which arise near the surface as a result of the field fluctuations caused by the slot openings. The use of dynamo sheet iron for the laminations 25 leads to a minimum in the additional surface losses. They can be viewed in this case as being virtually negligible.

Figure 6:
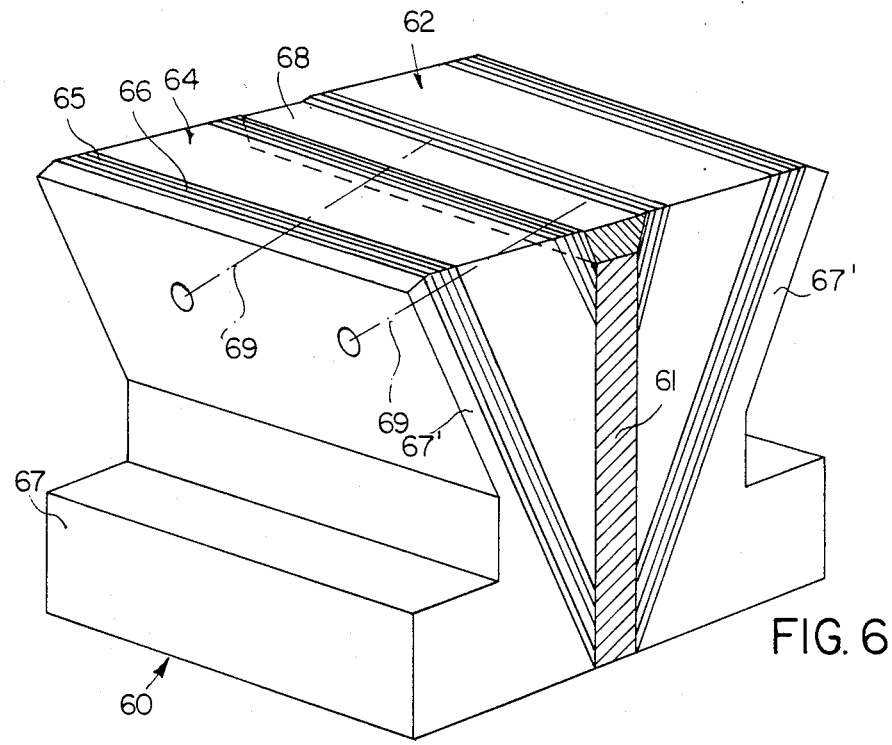
FIG. 6 shows a pole element comprising two pole portions of adjacent poles of a machine according to FIG. 4.

FIG. 6 shows a laminated pole element with the pole portions 62, 64 of two adjacent poles and the enclosed permanent magnets 61. The layered soft iron pole portions with axially directed laminations 65 and intermediate layers 66 adjoin the permanent magnets 61. Non-magnetic fastening elements 67 are used to mount the pole element to a supporting structure, e.g. a rotor structure (not shown), which is also formed of non-magnetic material. It may also prove expedient to secure the permanent magnets 61 and the pole portions 62 and 64 by a non-magnetic element 68. The element 68 may e.g. be mounted by bolts 69, which penetrate the supporting walls 67' of the fastening elements.

Figure 7:
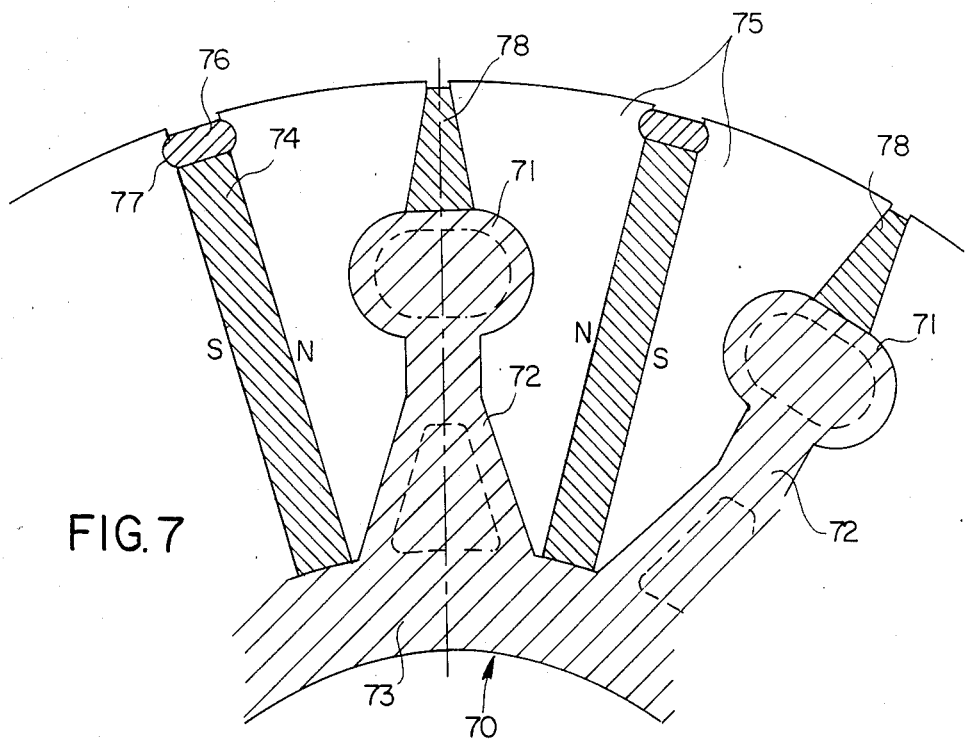
FIG. 7 shows another embodiment of the moving part of a machine according to FIG. 4.

In addition to this pole lamination, suitable for large pole pitches and high current loadings, a simple pole partitioning can also be achieved for smaller pole pitches by a single slit in the pole center. FIG. 7 shows a rotor cross-section embodying of this concept. The pole laminations 75 of the rotor 70 can thereby be arranged parallel to the plane of cross-section, i.e. with their planes oriented in the direction of motion of the rotor. Teeth 72 provided with a headlike enlargement 71 and being formed together with or being connected to the rotor body 73 serve as fastening elements. The rotor body 73 and the teeth are made of non-magnetic material and allow high peripheral speeds. The permanent magnets 74 are secured by wedge elements 76 positioned in the slits 77 in the adjacent sides of the pole portions. The gaps between the pole portions 75 radially outside the teeth heads 71 are filled with magnetically poorly conducting material 78.

Apart from the machine design itself, advantages also arise for the frequency converter. The current inverter feeding the machine can be designed with relatively little apparent power for low armature reaction, i.e. small $X_q$ corresponding to FIG. 3 (solid line diagram). The power semiconductor devices to accommodate the product of maximally occurring voltage and maximum current are thus more cost-effective than those of the machine type shown in FIG. 2. The strongly reduced field deformation due to the stator currents has an advantageous effect on the commutation. Moreover, it also has a favourable influence on the maximum necessary pulse frequency.

In FIG. 4, a multiphase winding with seven phases 51 to 57 (independent winding elements) is provided as a stator winding. It leads to a very high force density with equiphase currents, e.g. in six of seven phase coils. For an approximately uniform magnetic flux density in the pole region corresponding to FIG. 5 the optimum current distribution to achieve large forces at maximum efficiency is one which is also constant over the pole pitch. In general, this assumes individual phase currents which are independent of each other. Using the multiphase concept, higher utilization of the construction elements can also be obtained in the current inverter than in the three-phase design for example, as the number of current-carrying semiconductor switches is increased.

In order to achieve a particularly low-loss energy conversion, together with a high constructional utilization in both machine and current inverter, a number of phases higher than three proves to be particularly advantageous. In addition, the odd numbers of phases equal to five or seven respectively enable, owing to their favorable operating symmetry, less constructional outlay in the machine winding and current inverter circuits than is the case for an even number of phases.

Figures 8, 9:
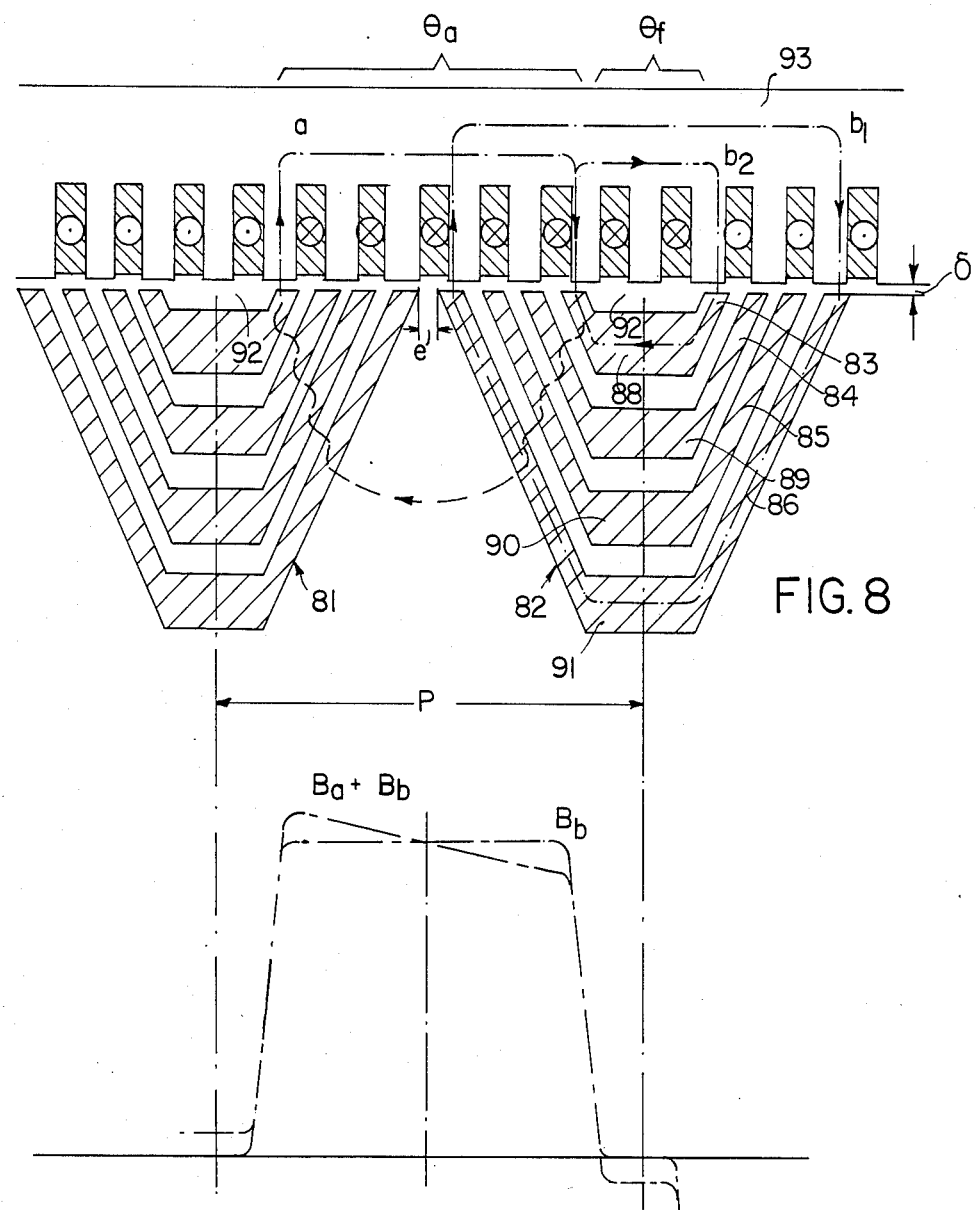
FIG. 8 shows schematically an embodiment of a reluctance machine according to the invention.
FIG. 9 shows the flux density distribution of the machine according to FIG. 8.

If the laminated triangular pole portions are connected by magnetically conducting paths in their middle region, i.e. where according to FIGS. 4 to 7 the permanent magnet is situated, the rotor is then magnetically passive, corresponding to FIG. 8. The laminations 83, 84, 85 and 86 of the pole portions 81, 82 are also converging. Between their ends magnetic bridges 88, 89, 90 and 91 are provided, which extend mainly parallel to the effective gap δ and may be formed in one piece with the laminations. The bridge 88 of the laminations 83 is formed with a recess 92, by which between the pole portions an enlarged gap is formed having a width corresponding to at least one slot separation of the stator 82. In the embodiment of FIG. 8 the width of the gap corresponds to two slot separations. The interpolar distance determines the field intensity in the pole region via the sum of the stator winding currents ($\theta_f$) which are responsible for the excitation of the magnetic field. If a multiphase winding according to FIG. 4 is again assumed, then the corresponding winding currents determining the field and the currents in the pole region can be separately adjusted. They can be influenced by appropriate circuit switching in the corresponding current inverter phases. This technique is termed multiphase current control.

The magnetic flux density corresponding to the field lines $b_1$ and $b_2$ is generated by the coil currents assigned to the interpolar space (e.g. two slot widths) with ampere turns $\theta_f$. The magnetic field is again distributed virtually evenly over the whole pole width due to the selected pole geometry. High flux densities can likewise be attained in the pole region under these assumptions using electrical excitation from the stator. The laminated pole arrangement allows the field deformation due to the stator currents to be strongly suppressed in comparison with known solutions. FIG. 9 shows the no-load field $B_b$, excited by the stator windings over the gap 92 and the resultant total field generated by the components of all windings $\theta_f + \theta_a$.

The reduction in the field distortion has a simlar significance for reluctance machines as is the case for permanently excited synchronous machines according to FIG. 4. With low armature reaction, higher force densities for a given current and better current inverter constructional utilization can be achieved, together with improved commutation behavior.

The current inverter fed reluctance machine achieved under these assumptions exhibits high force densities similar to those of permanently excited machines. The elimination of the permanent magnets signifies a cost saving and a simplification in the machine manufacture. In addition, the adjustability of the excitation, as is the case for multiphase windings with independently fed phase conductors, offers considerable advantages in operation. The adjustment and control behavior of a reluctance machine of this type is similar to that of an (independently excited) d.c. machine with separately adjustable field and armature currents.

For designs requiring safety protection, the deexcitation of the machine via the winding current can represent a very positive characteristic. With the provision of appropriate winding partitioning, subsections of the machine can be switched off when accidental breakdown occurs, whereas unaffected sectors can remain operating.

Figures 10, 11:
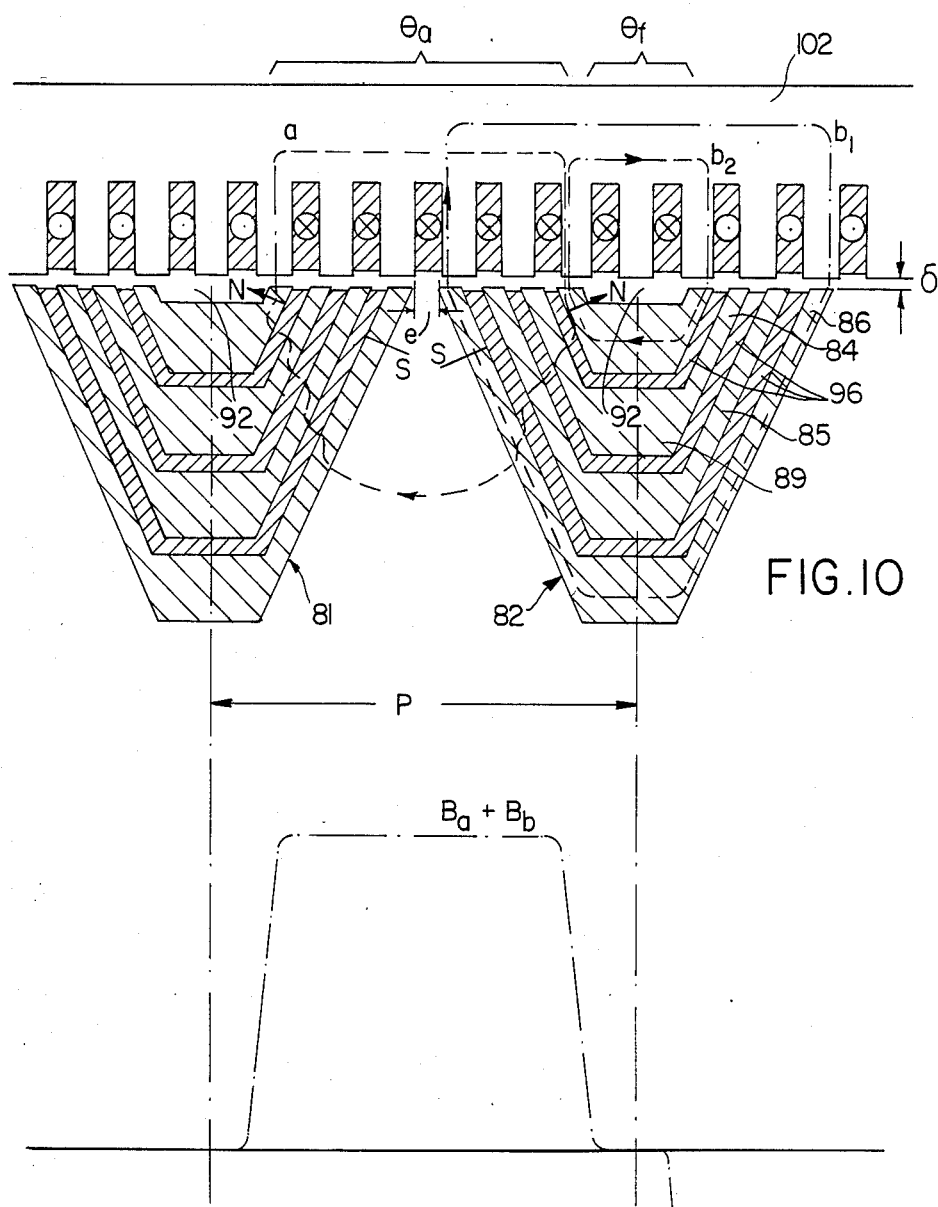
FIG. 10 shows a modified embodiment of the reluctance machine according to FIG. 8.
FIG. 11 shows the flux density distribution of the machine according to FIG. 10.

For these applications with particularly demanding requirements on machine efficiency and force density it is possible to achieve a further improvement in the reluctance concept by compensating the stator field without power dissipation with the aid of permanent magnets. In this case it also should be assumed that laminated pole elements corresponding to FIG. 8 are present to achieve field compensation over the whole pole region. Therefore for equal elements in FIG. 10 are used the same reference numbers as in FIG. 8. In addition, it is also of particular advantage to choose the lamination separation to be smaller than the slot separation of the stator. Permanent magnets 96 are employed in the slits of the laminated pole elements to compensate the magnetic field generated on the field paths a by the stator currents. The direction of magnetization is transverse to the slits and directed equally in all slits. It can be shown that the use of inexpensive ferrite magnets suffices to compensate stator current loadings up to approximately 1200 A/cm. Field compensation can also be performed with the same magnet material by reducing the slit width, even for smaller current loadings.

Thus relatively strong stator fields can be compensated with ferrite magnet material.

FIG. 11 shows the flux density curve under load. If the current magnitude in the winding is reduced, then in comparison to FIG. 9 a field deformation occurs in the opposite direction. It can in this case be assumed that the disadvantages of the field distortion no longer play a significant role with decreased peripheral force. The distortion of the field pattern which now occurs in the opposite direction has for example the advantage that the commutation process is accelerated. The resulting field along the field line a disappears at rated load (full compensation).

The above described embodiment of the permanently excited poles and the possibility of pole excitation via the stator with the aid of a multiphase winding can be combined. Using these means it is possible to generate a particular degree of excitation (a particular flux density) in the no-load field solely by the permanent magnets without power dissipation, whereas higher or lower flux densities can be produced with the aid of stator excitation. This corresponds to the situation well-known in certain applications in which operating conditions at maximum field strength and ones at minimum strength only appear for a short time in comparison with conditions of mean field strength.

Figure 12:
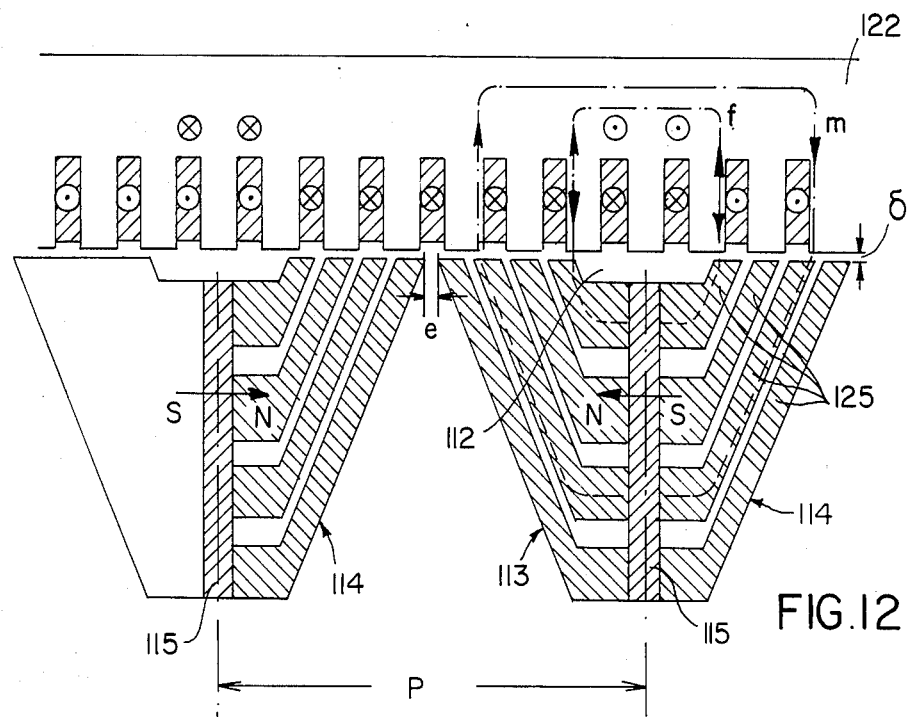
FIG. 12 shows a further embodiment of a machine according to the invention provided with mixed excitation.

FIG. 12 shows an embodiment according to FIG. 10. In the middle of the pole portions of soft iron laminated in axial direction, i.e. of the bridges between the pole portions 113, 114, an accordingly dimensioned permanent magnet 15 is provided as in case of the embodiment according to FIG. 4. The interpolar distance 112 is thereby constructed, as in the mere reluctance version according to FIGS. 8 and 10, to be so wide that the necessary exciter ampere turns $\theta_f$ are available to alter the no-load field. As the field intensity $B_m$ generated by the permanent magnets is now lower than that for exclusive permanent magnet excitation (FIG. 4), the height of the permanent magnet can now be reduced. It can, for example, still lie below 1 cm where rare earth-/cobalt magnets are employed, if $B_m$ values between 0.4 and 0.5 T are to be achieved. If one allows for a ratio of magnet to pole surface area of about 2 then a magnet of 0.8 cm in height would lead to an apparent air gap enlargement of about 0.2 cm. It thus becomes clear that flux densities $B_f$ from 0.2 to 0.3 T are attainable with limited ampere turns $\theta_f$. Magnets with even higher $B_f$ values enhance the concept.

Figure 13:
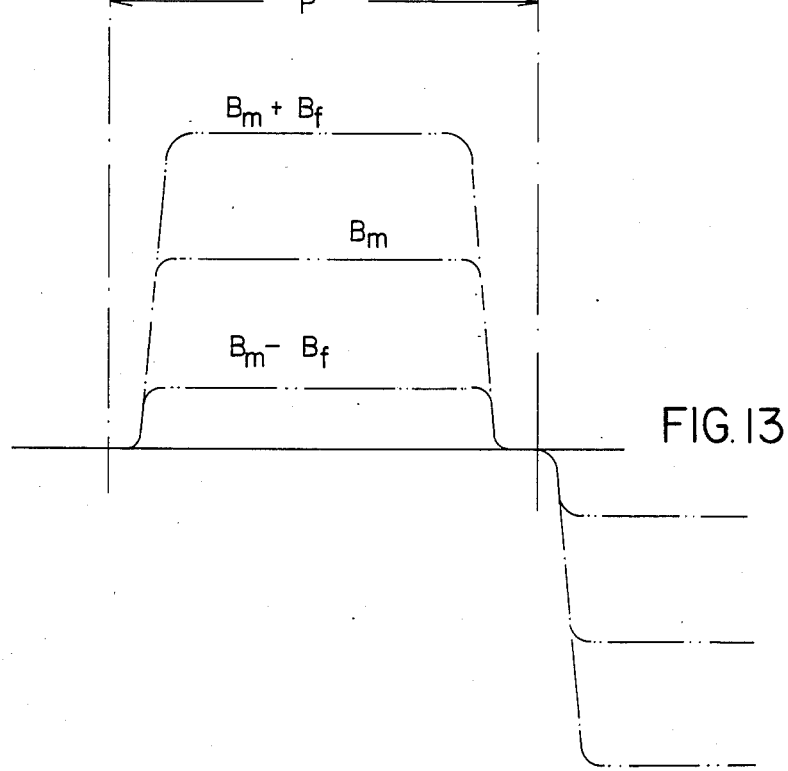
FIG. 13 shows the flux density distribution of the machine according to FIG. 12.

The flux density curves are represented in FIG. 13 for three cases.

$B_m$ designates in FIG. 13 the field curve without stator excitation. $B_m+B_f$ indicates the attainable maximum value, whereby the effects of the permanent magnets and the stator excitation are mutually supporting. $B_m-B_f$ designates the minimal flux density. The stator excitation counteracts the permanent magnet excitation. Independent of the magnet material it is important to observe that the counter-excitation prevents the occurence of irreversible magnetization in the magnet material. Within the outlined limits, continuous adjustment of the flux density is possible with the aid of the stator currents. The mixed excitation concept is particularly advantageous in comparison with other designs when the permanent magnet thickness shall be kept small.

What we claim as our invention and desire to source by Letters Patent of the United States is:

1. Electrical machine comprising a stationary part having a multiphase winding, and a movable part separated from said stationary part by an effective gap, said movable part including a plurality of poles each comprising a pair of adjacent pole portions each having first and second end regions located, respectively, at and remote from said effective gap, said pole portions of each pole being shaped so as to diverge away from each other in the direction away from said effective gap and having their first end regions separated from each other by a magnetically non-conductive separating gap which is greater than said effective gap, and a respective permanent magnet interposed between each of said pole portions and the proximate pole portion of the next adjacent one of said poles, the direction of flux of each of said permanent magnets being opposite to the direction of flux of each next adjacent permanent magnet.

2. Electrical machine according to claim 1, wherein the direction of flux of each permanent magnet is mainly parallel to the effective gap.

3. Electrical machine according to claim 1, wherein in the area between each two adjacent poles of said movable part at said effective gap a magnetically effective enlargement of the width of said effective gap is provided, said enlargement extending over at least one slot pitch of said stationary part.

4. Electrical machine according to claim 3, wherein the ratio of the magnet surface area to the pole surface area for each permanent magnet and its associated pole of said movable part is about 2.

5. Electrical machine according to claim 1, wherein the phase number of said multiphase winding of said stationary part is greater than three per each pole pitch of said movable part.

6. Electrical machine according to claim 5, wherein said phase number is an odd number with reference to said pole pitch of said movable part, being preferably five or seven.

7. Electrical machine according to claim 1, wherein each of said pole portions is composed of a plurality of pole laminations oriented transversely to the direction of motion of said movable part, said pole laminations of each pole portion being separated from each other by non-magnetic spaces.

8. Electrical machine according to claim 6, wherein said non-magnetic spaces are filled by a mechanically resistant and magnetically poorly conductive material.

9. Electrical machine according to claim 6, wherein the width of each of said non-magnetic spaces approximately corresponds to the width of said effective gap.

10. Electrical machine according to claim 7, wherein said pole laminations consist of iron sheets having their planes oriented in the direction of motion of the movable part.

11. Electrical machine according to claim 7, wherein the sum of the thicknesses of said pole laminations of said movable part corresponds at least to the sum of the tooth widths of said stationary part.

* * * * *